Jan. 21, 1936.   C. S. FRANKLIN ET AL   2,028,596
OSCILLATION CIRCUIT
Filed May 19, 1930
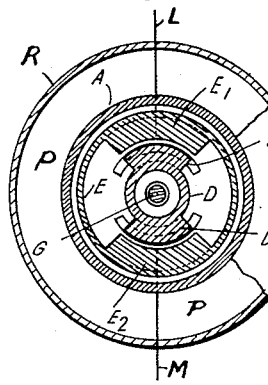
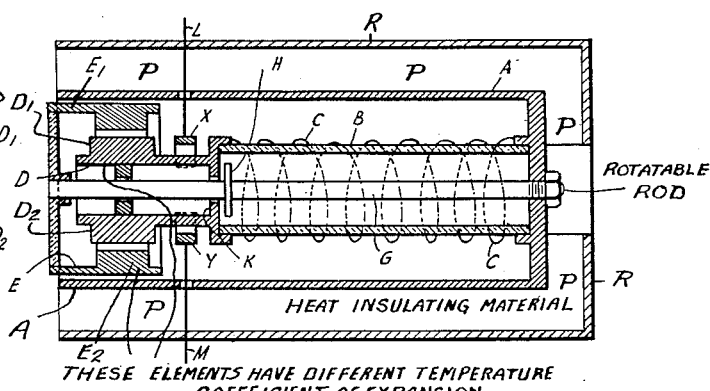
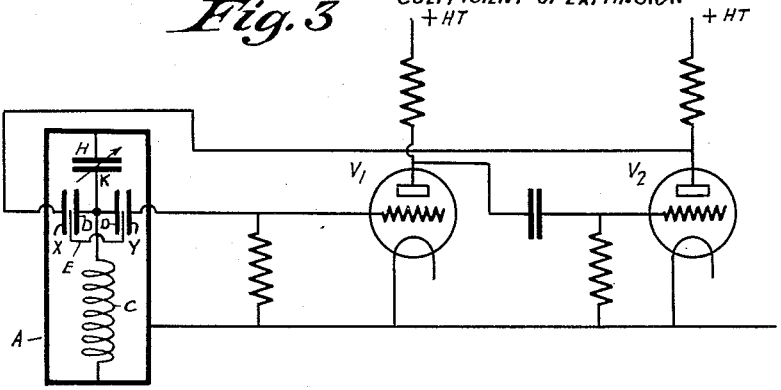
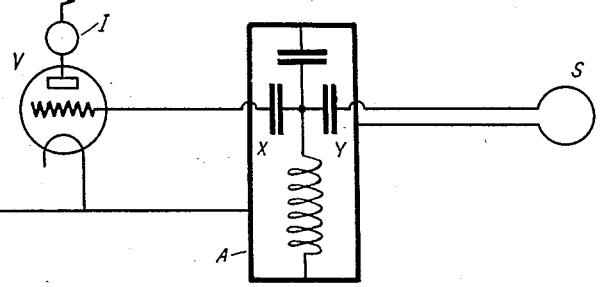
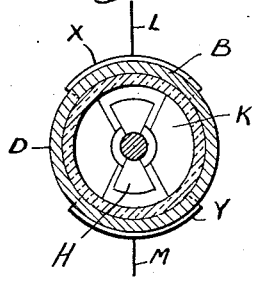
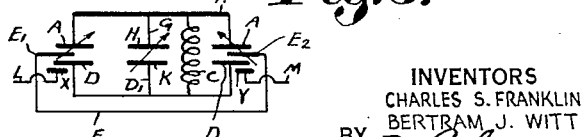
INVENTORS
CHARLES S. FRANKLIN
BERTRAM J. WITT
BY
ATTORNEY Patented Jan. 21, 1936

2,028,596

UNITED STATES PATENT OFFICE 2,028,596

OSCILLATION CIRCUIT

Charles Samuel Franklin and Bertram John Witt, London, England, assignors to Radio Corporation of America, a corporation of Delaware Application May 19, 1930, Serial No. 453,478
In Great Britain May 23, 1929

7 Claims. (Cl. 250—36)

This invention relates to electrical inductances and capacities, and to oscillatory circuits.

The invention is applicable to various circuit arrangements, such, for example, as valve oscillation generators for controlling the frequencies of radio transmitters or frequency indicating arrangements for use as wavemeters and like purposes.

The invention has for its object to provide a circuit arrangement whose component inductances and/or capacities shall not vary substantially in natural frequency or other constants (so-called) with temperature.

In accordance with the present invention an oscillatory circuit is provided with a temperature actuating device whereby the inductance and/or capacity comprised in said circuit is automatically regulated so that the circuit as a whole is substantially immune from variations in natural frequency due to the effect of temperature in for example a condenser included in the said circuit.

The inductances and/or capacities included in the circuit may be formed of material having different coefficients of expansion said materials being so chosen and the inductances and/or capacities so constructed that the inductance and/or capacity in the circuit on the product of the inductance and capacity in the circuit will remain substantially constant over a wide range of temperature.

There are a number of ways whereby this result may be achieved; for instance a bi-metallic strip of well known kind commonly employed in temperature control devices may be utilized to adjust one plate of a condenser or one element of an inductance so that the product of the inductance and capacity is maintained constant over a wide range of temperature.

In one form of construction, a condenser for use in carrying out the present invention comprises a plurality of series and parallel plates which are spaced apart, and the materials of which the plates are made and by which said plates are held in spaced relation are so chosen that an increase in capacity due to an increase in area of the plates with a temperature change, is compensated for by an increase in the spacing between the plates.

In another form of construction, the plates of a condenser are in the form of concentric cylinders, the outer metallic cylinder being made of a material whose coefficient of temperature expansion exceeds that of the inner metallic cylinder. In this construction, increased separation of the plates with increased temperature will compensate for the effect of increased areas of the said plates. It will be seen that were the plates of the same metallic material, the capacity would increase with increased temperature, since the ratio of the diameters would remain substantially constant while the length increases.

In a further modification, an inductance coil is combined with the condenser plate K mentioned above for use in carrying out the invention, the inductance coil is wound in one or more layers upon an insulated cylindrical or polygonal form, and, in order that the inductance may not substantially vary with temperature, the length of the form is made materially greater than the diameter of the form so that the proportional axial expansion exceeds the radial expansion of the inductance coil.

While it is preferable as a rule to constitute a reactive circuit by elements such that both inductance and capacity remain constant, it is possible, if desired, to provide for compensation of one or part of one of these elements only in such a manner that the product of the inductance and capacity remains substantially constant.

The invention is illustrated in the accompanying drawing. In the drawing, Figures 1 and 2 show in side and end section respectively a tuned circuit arrangement in accordance with this invention. Figures 3 and 4 show a tuned circuit arrangement associated with valves for employment as an oscillator and as a wavemeter respectively. Figure 5 shows a diagram of the electrical tuning arrangement of the variable elements. Figure 6 shows a partial detailed sectional elevation of a portion of Figure 1.

Referring to Figures 1 and 2, A is a cylindrical metal case which forms one of the condenser electrodes. To the base of the casing A there is fixed an insulating tube B carrying a coil winding C which forms the inductance of the circuit arrangement. On the end of tube B is fixed a metallic member D which is of general cylindrical shape and is concentrically arranged within an approximately cylindrical floating metallic member E which is in turn concentrically arranged within the metallic case A so as not to be in electrical contact with either members A or D as shown in the diagram Figure 5. The members D and E are provided with sector shaped projections $D_1D_2$ and $E_1E_2$ as shown in Figure 2. These projections form the co-operating plates of a variable condenser and it will be apparent from Figure 2 that if the floating electrical member E be rotated in the space between A and D and within the area of the parallel opposite metallic sector-shaped surfaces of members D and E the capacity between D and E will be varied. Also mounted in the base of the container A is a metallic rod G carrying a metal disc H the said rod being concentric with the members D and E. The metal disc H is as shown in Figure 1 adjacent a disc or ring like portion K on the member D so that the parts H and K form a condenser which is in electrical series in parallel relation with the condensers constituted by the members A, D and E. It will be obvious that in order to obtain accurate compensation for temperature at all positions of the variable condenser D E the proportional capacities between the parts H and K must be arranged to have suitable values at every position of the variable condenser. This can be carried into effect by shaping the parts H and K as shown by Figure 6 which is in a somewhat similar manner to the parts D and E and arranging to rotate the rod G with the movable part E so as to change the surface area of the variable condenser. It will be observed that the capacity between the discs K and H is directly affected by any relative expansion between the members B and G, as B is of insulating material having a lower coefficient of expansion, and G having material of a higher coefficient of expansion, therefore by suitably proportioning the parts concerned, the whole arrangement may, as regards natural frequency be rendered substantially independent of temperature.

In the other form of construction mentioned above the condenser plates are in the form of concentric cylinders. The outer metallic cylinder such as E which forms one of the condenser electrodes, is composed of a metallic cylinder having a relatively large coefficient of temperature expansion. The inner cylinder such as D, which forms the other condenser electrode, is composed of a metallic cylinder having a small coefficient of temperature expansion. Therefore, when there is an increase in temperature there will be a corresponding increased separation between the condenser electrodes or plates D and E, which will compensate for the effect of the increased area of the plates caused by expansion both radially and axially, whereas if plates D and E were made of the same metallic material, the capacity between the plates would increase with an increase in temperature as the ratio of the diameters in the latter case would remain substantially constant while the length of the plates would increase.

In practice, the case A should be thermally isolated, for example, by enclosing it in an outer case B from which it is separated by some heat insulating material P. In this way any change of temperature occurring to the parts within the container A will only take place slowly so that only very small differences of temperature between those various parts can ever exist.

The circuit arrangements thus described and shown diagrammatically by Figure 5 are adapted to be capacitively coupled to external apparatus by means of small metal electrodes X and Y which may conveniently be arcuate in shape and which partly embrace the main body of the member D between the part K and the parts $D_1$ and $D_2$. The electrodes X, Y, are connected to leads L, M, passing through holes in the container A as shown. The arrangement as regards the electrodes X and Y should be such that the direct capacity between the said electrodes is so small as to be negligible. The leads L M form the main connection leads for the whole device and one may be connected say to the grid of the first valve in a valve amplifier while the other is connected to the output end of the said amplifier. Then, provided of course that the output end of the amplifier is arranged to be of correct phase, the circuit within the container A will be maintained in oscillation. It will be observed moreover that by employing an amplifier of large magnification the size of the electrodes X and Y and their capacities to the member D may be kept very small and in this way the frequency generated may be made substantially independent of the characteristics of the amplifying valves and associated apparatus and dependent only upon the circuit constants of the apparatus within the container A. It has been found that with careful construction an oscillator of this kind can be made to generate frequency which is constant within one part in one million over a wide range of temperature.

Figure 3 shows a circuit in which the arrangement within the container A is associated with a simple resistance capacity coupled amplifier comprising two valves $V_1$ $V_2$. In view of the preceding description it is thought that the arrangement of Figure 3 will be obvious from the drawing.

Figure 4 shows a modified circuit suitable for use as a wavemeter. In this case one electrode Y is connected to a search coil S while the other X is connected to a valve whose anode circuit includes any convenient form of indicator I. Since the direct capacity between X and Y is negligible the indicator I will show a maximum reading when the oscillations induced in the search coil S from the apparatus in which the measurement is to be effected are in tune with the circuit within the container A.

Having thus described our invention, we claim:

1. In an oscillatory circuit an inductance, a tuning capacity therefor, one electrode of said capacity comprising a metallic cylinder enclosing said inductance and a second electrode adjustably mounted within said cylinder, a compensating capacity whose electrodes are enclosed in said metallic cylinder, one electrode of said compensating capacity being integral with an electrode of said tuning condenser, the other electrode being mounted on material having a different coefficient of expansion than the first mentioned electrode of said compensating condenser and being connected to said metallic cylinder.

2. In an oscillatory circuit of constant frequency an inductance, a tuning capacity therefor, one electrode of said capacity including a metallic cylinder enclosing said inductance, the other electrode of said capacity being in the form of a cylinder concentrically arranged within said metallic cylinder, and a compensating capacity whose electrodes are enclosed in said metallic cylinder, the electrodes of said compensating capacity being mounted on materials having different coefficients of expansion whereby physical changes in said circuits are compensated by change of reactance of said compensating capacity.

3. An oscillation circuit comprising a tuning element and a compensating element, a metallic cylindrical member which forms one electrode of the tuning element, a second electrode of said tuning element being electrostatically connected to said first mentioned electrode and mounted within said first named electrode but spaced mechanically therefrom, a second cylindrical member of nonconducting material located within said first named cylindrical member, an inductance mounted on said nonconducting member, a compensating condenser one electrode of which is mounted on said last named tuning element electrode, a rod mounted at the end of said cylindrical member and within both said cylindrical members and coaxial therewith, the other electrode of said compensating condenser being mounted on said rod adjacent said first named electrode of said compensating condenser.

4. An oscillation circuit comprising a tuning element having a metallic cylindrical member which forms one electrode of the tuning element, a second electrode of said tuning element being mounted within said first named element and spaced therefrom, a second cylindrical member of nonconducting material located within and supported by said first named cylindrical member, an inductance mounted on said nonconducting member, a compensating condenser one electrode of which is integral with the last named electrode of said tuning element and the other electrode of which is mounted on a rod which is located within said last cylindrical member and supported coaxially with respect thereto, said rod having a coefficient of expansion different than the coefficient of expansion of said last cylindrical member, and a coupling capacity enclosed within said metallic cylinder and electrically coupled to said last named electrode of said tuning element for coupling said oscillation circuit to any desired associated circuit.

5. An oscillation circuit comprising a tuning element and a compensating condenser, a metallic cylindrical member which forms one electrode of the tuning element, a second tuning electrode adjustably mounted within said first named electrode and spaced therefrom, a second cylindrical member of nonconducting material located within said first named cylindrical member, an inductance connected to said second tuning electrode and mounted on said nonconducting member, one electrode of said compensating condenser being mounted on the last named electrode of said tuning element, a rod mounted within said second cylindrical member and coaxial therewith, said rod having a coefficient of expansion different than the coefficient of expansion of said second cylindrical member, the other electrode of said compensating condenser being mounted on said rod adjacent said first named electrode of said compensating condenser, and a plurality of coupling condensers mounted within said cylinder and electrically coupled to said first electrode of said compensating condenser.

6. In an oscillation generator comprising in combination an electron discharge device having input and output circuits and an oscillating circuit coupled to the input and output circuits of said device, said oscillating circuit including an inductance coil, said inductance coil having connected thereto temperature controlled capacity compensating means to maintain the frequency of the oscillating circuit substantially constant and independent of temperature changes, said capacity compensation means comprising a metallic casing, said casing forming one of the terminals of the inductance coil and enclosing said coil, said compensating means including a pair of spaced variable capacity electrodes concentrically arranged within said casing and electrostatically coupled to each other and to said casing, and a third electrode within said casing conductively connected to said casing and capacitively coupled to the inner electrode of said pair, the other terminal of said inductance being connected to said inner electrode of said pair.

7. In an oscillation generator comprising in combination an electron discharge device having input and output circuits and an oscillating circuit coupled to the input and output circuits of said device, said oscillating circuit including an inductance coil, said inductance coil having connected thereto temperature controlled capacity compensating means to maintain the frequency of the oscillating circuit substantially constant and independent of temperature changes, said capacity compensating means comprising a metallic casing, said casing forming one of the terminals of the inductance coil, said inductance coil being located within said casing and centrally supported thereon by an insulating tubular member connected at one end to said casing, a first variable capacitive electrode supported at the free end of said insulating tube, a second capacitive electrode coupled to said first electrode and supported on a central metallic rod which is secured to said metallic casing, a third variable electrode intermediate said first variable capacitive electrode and said metallic casing and electrically coupled to the casing and said first mentioned electrode, a pair of additional electrodes within said casing and electrostatically coupled to said first mentioned electrode, and a pair of leads connected to said pair of additional electrodes and extending through said casing, whereby said device may be coupled to said oscillating circuit.

CHARLES SAMUEL FRANKLIN.
BERTRAM JOHN WITT.